US010094322B1

(12) United States Patent
Nieddu et al.

(10) Patent No.: US 10,094,322 B1
(45) Date of Patent: Oct. 9, 2018

(54) FUEL-INJECTION DELIVERY MEASUREMENT

(71) Applicant: GM Global Technology Operations LLC, Detroit, MI (US)

(72) Inventors: Stefano Nieddu, Turin (IT); Roberto Morone, Monta-Cuneo (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/594,982

(22) Filed: May 15, 2017

(51) Int. Cl.

| | |
|---|---|
| ***B60T 7/12*** | (2006.01) |
| ***F02D 41/38*** | (2006.01) |
| ***F02D 41/40*** | (2006.01) |
| ***F02B 1/06*** | (2006.01) |
| ***F02D 41/18*** | (2006.01) |
| *F02B 1/02* | (2006.01) |
| *F02D 41/30* | (2006.01) |

(52) U.S. Cl.
CPC ............ *F02D 41/3872* (2013.01); *F02B 1/06* (2013.01); *F02D 41/182* (2013.01); *F02D 41/401* (2013.01); *F02B 1/02* (2013.01); *F02D 41/18* (2013.01); *F02D 41/30* (2013.01); *F02D 41/38* (2013.01)

(58) Field of Classification Search
CPC ........ B60W 2510/0619; F02B 19/1052; F02B 19/1085; F02D 2700/02; F02D 19/023; F02D 2200/0602; F02D 2700/0261; Y02T 10/44
USPC ................ 701/103, 104, 105, 107, 114, 115; 123/434, 437
See application file for complete search history.

(56) References Cited

U.S. PATENT DOCUMENTS

| | | | | |
|---|---|---|---|---|
| 6,192,863 | B1 * | 2/2001 | Takase | F02D 41/3809 123/357 |
| 6,227,168 | B1 * | 5/2001 | Nishiyama | F02D 41/401 123/456 |
| 2014/0358408 | A1 * | 12/2014 | Pursifull | F02D 41/062 701/113 |
| 2016/0215708 | A1 * | 7/2016 | Nieddu | F02D 41/2467 |
| 2018/0017010 | A1 * | 1/2018 | Nieddu | F02D 41/3872 |

* cited by examiner

*Primary Examiner* — John Kwon
(74) *Attorney, Agent, or Firm* — Cantor Colburn LLP

(57) ABSTRACT

Technical solutions are described for measuring fuel injection to an engine of a vehicle. For example, an engine control unit (ECU) that controls the operation of the engine, is equipped with a first direct memory address channel to store rail pressure values that are received from the engine in a first buffer. The ECU further includes a second direct memory address channel configured to copy a first subset of the rail pressure value from the first buffer to a filter module in response to an angle-based interrupt request. The ECU further includes a third direct memory address channel configured to copy filtered pressure values from the filter module to a second buffer. The ECU also includes a processor that computes a pressure drop based on the filtered pressure values from the second buffer, and compute a quantity of fuel injected into the engine based on the pressure drop.

18 Claims, 6 Drawing Sheets

FUEL-INJECTION DELIVERY MEASUREMENT

INTRODUCTION

The subject disclosure relates to a fuel delivery measurement device used for measuring fuel delivery to and fuel consumption of an internal combustion engine.

Automotive vehicles typically include a fuel delivery system with a pump installed, either inside of a fuel storage tank, or externally with respect to the fuel storage tank, to pressurize the fuel. The fuel is supplied to the engine fuel rail. The fuel rail contains the fuel injectors and a relief regulator. The relief regulator maintains a required predetermined pressure at the fuel injectors. The flow rate and pressure setting can vary from vehicle to vehicle.

An engine control system of a vehicle controls the delivery of air and fuel to a cylinder of an engine. The mixture of air and fuel is combusted within the cylinder to generate torque. More specifically, combustion of the air/fuel mixture releases thermal energy that drives pistons within the cylinders to power the vehicle. A fuel injector associated with the cylinder provides the fuel of the air/fuel mixture. The amount of fuel provided by the fuel injector is based on an amount of air provided to the engine for a target torque.

Typically, fuel pumps provide between 30% to 50% more fuel than the maximum amount of fuel consumed by the engine. If the fuel pump delivers more fuel than this, the relief regulator cannot maintain proper pressure due to internal restrictions.

Thus, measuring fuel injected to the engine facilitates the engine to operate. Further, measuring fuel delivery during operation of an engine the vehicle facilitates various functions, such as measuring efficiency of the engine and reducing emissions from the engine. For example, one way to reduce emissions from an engine involves recirculating exhaust gas into the combustion process. Exhaust gas recirculation (EGR) may be used in a diesel engine. Providing a small pilot injection quantity (or "shot") prior to a main fuel injection event may help to stabilize combustion when EGR is used. The amount and timing of the pilot injection is usually based on a calibrated amount for the engine. Deviations from the calibrated amount and timing of the pilot injection may reduce its effectiveness in aiding combustion and decreasing exhaust emissions. Accordingly, accurate measurement of fuel delivery for the pilot injection facilitates reducing emissions. Measuring the fuel injected to the engine, thus, facilitates the engine operation and further improves the operation of the engine.

Accordingly, it is desirable to measure fuel injected to the engine.

SUMMARY

In one exemplary embodiment an engine control unit (ECU) that controls the operation of an engine is described for measuring fuel injection to the engine of a vehicle. For example, the ECU is equipped with a first direct memory address channel to store rail pressure values that are received from the engine in a first buffer. The ECU further includes a second direct memory address channel configured to copy a first subset of the rail pressure value from the first buffer to a filter module in response to an angle-based interrupt request. The ECU further includes a third direct memory address channel configured to copy filtered pressure values from the filter module to a second buffer. The ECU also includes a processor that computes a pressure drop based on the filtered pressure values from the second buffer, and compute a quantity of fuel injected into the engine based on the pressure drop.

In addition to one or more of the features described herein the processor initializes the first direct memory address channel at startup with a predetermined address of the first buffer. Further, in response to the angle-based interrupt request, the processor initializes the second direct memory address channel with a working address of the first direct memory address channel at the time the angle-based interrupt request is received. In one or more examples, the first subset of the rail pressure values comprises rail pressure values from the working address. Further, the third direct memory address channel copies output from the filter module to the second buffer in response to the angle-based interrupt request being received. In one or more embodiments, the filter module is a separate hardware filter module that implements an nth-order sinc filter. Additionally, in one or more examples, the angle-based interrupt request is indicative of the engine being at a predetermined angular position.

In another exemplary embodiment a computer program product for computing quantity of fuel injected into an engine is described, where the computer program product includes non-transitory computer readable storage medium embedded with computer executable instructions. For example, the computer readable storage medium includes instructions to store rail pressure values received from the engine to a first buffer using a first direct memory address channel. The computer readable storage medium further includes instructions to copy a first subset of the rail pressure values from the first buffer to a filter module using a second direct memory address channel, in response to an angle-based interrupt request. The computer readable storage medium further includes instructions to copy filtered pressure values from the filter module to a second buffer using a third direct memory address channel. The computer readable storage medium further includes instructions to compute a pressure drop based on the filtered pressure values from the second buffer, and compute a quantity of fuel injected into the engine based on the pressure drop.

In one or more examples, the first direct memory address channel is initialized at startup with a predetermined address of the first buffer. Further, in response to the angle-based interrupt request, the second direct memory address channel is initialized with a working address of the first direct memory address channel at the time the angle-based interrupt request is received. In one or more examples, the first subset of the rail pressure values includes rail pressure values from the working address. Further, in one or more examples, the third direct memory address channel copies output from the filter module to the second buffer in response to the angle-based interrupt request being received. In one or more examples, the filter module is an nth-order sinc filter. Further, the angle-based interrupt request is indicative of the engine being at a predetermined angular position.

In yet another exemplary embodiment a computer-implemented method for measuring fuel injected into an engine is described. For example, the computer-implemented method includes continuously storing rail pressure values from the engine into a first buffer using a first direct memory access channel. The method further includes, in response to an event indicating that the engine is at a predetermined angular position, capturing a working memory address of the first direct memory access channel, wherein the working memory address is an address from the first buffer at which a last rail pressure value is last stored, and filtering subsequent rail pressure values, starting at the working memory address, from the first buffer into a second buffer using a second direct memory access channel. The method further includes computing a pressure drop from the rail pressure values that are stored in the second buffer, and computing a quantity of fuel injected into the engine based on the pressure drop.

In one or more examples, filtering the rail pressure values from the first buffer includes copying, by the second direct memory access channel, the subsequent rail pressure values, starting at the working memory address, from the first buffer into an input area of a hardware filter module; and copying, by a third direct memory access channel, output of the hardware filter module into the second buffer.

Further, in one or more examples, the hardware filter module filters the rail pressure values to eliminate pressure-waves using a sinc filter.

Further, in one or more examples, the computer-implemented method includes computing a fuel injection position of the fuel injector based on the subsequent rail pressure values in the first buffer, starting from the captured working address.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
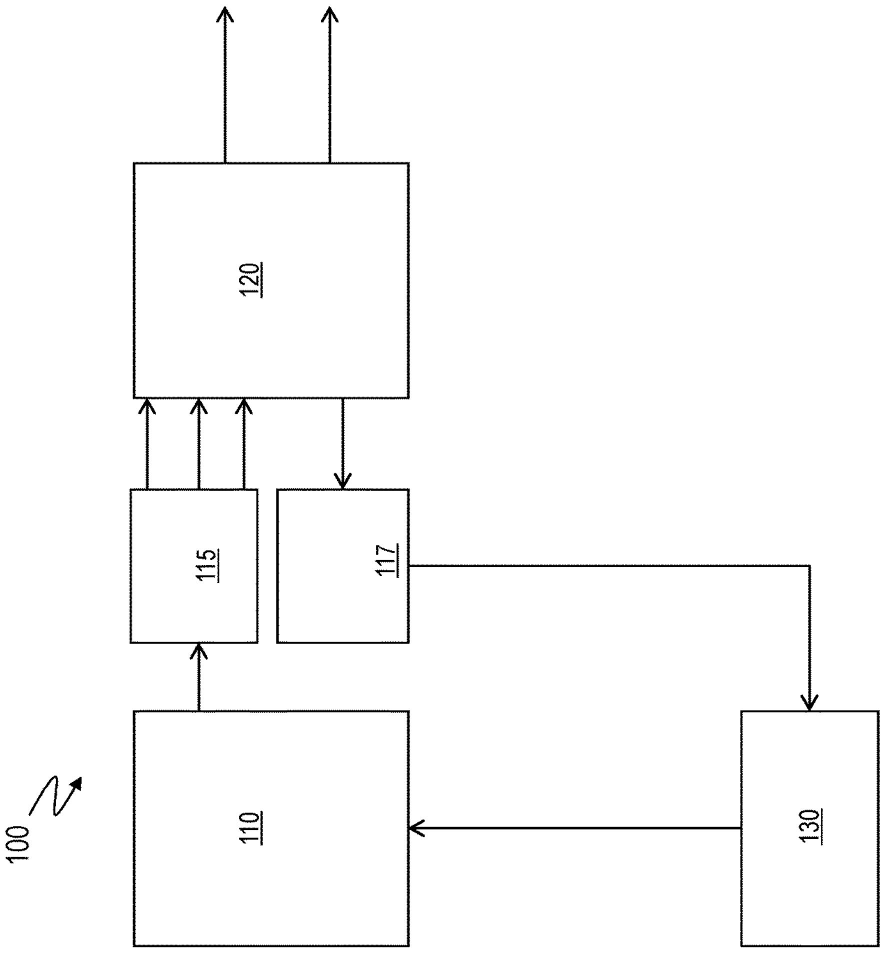
FIG. 1 is a block diagram that shows an example schematic construction of a fuel flow rate measuring apparatus.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In accordance with an exemplary embodiment the technical solutions herein address the technical challenges of measuring fuel injected for operation of an engine of a vehicle by using a processing unit, such as a microprocessor, to process one or more sensor signals obtained from the engine. The one or more examples of fuel injection measurement systems implementing the technical solutions described herein facilitate measuring and processing a large amount of data samples, such as 4 KB, 8 KB, and the like, in real-time or near real-time using an ECU of a vehicle. Moreover, the technical solutions described herein facilitate performing the analysis for determining the fuel injection measurements using an engine control unit, which controls the operation of the engine. Thus, the technical solutions described herein facilitate the fuel injection measurements without adversely impacting the existing computational load of the engine control unit for engine management functionalities. For example, the technical solutions described herein use microcontroller direct memory access (DMA) and decimation filters for facilitating microcontroller embedded digital devices in the vehicle and the engine control unit to process the fuel injection related data samples to measure the fuel injection accurately. Accordingly, the technical solutions described herein do not require additional hardware devices, and have negligible impact on the load of the engine control unit, thus resulting in zero to negligible cost impact.

FIG. 1 is a block diagram that shows the schematic construction of a fuel flow rate measuring apparatus 100 for an internal combustion engine according to one or more embodiments. For example, an internal combustion engine (ICE) 110 is provided with an engine control unit (ECU) 120 for controlling the injection of fuel, ignition timing, and other aspects of the ICE 110, and a fuel tank 130 for supplying fuel F to the ICE 110. In one or more examples, the apparatus may further include a fuel flow rate display device (not shown) for displaying the flow rate of fuel.

For example, a pump (not shown) pumps fuel out of the fuel tank 130 at a predetermined pressure which is set by one or more relief valves. The ICE 110 may further be connected to a fuel rail (not shown) that supplies the fuel injectors 117. The fuel F may be passed through one or more filters prior to sending into the ICE 110. The amount of fuel F injected into the ICE 110 is regulated by increasing and/or decreasing pressure using one or more pumps, relief valves, and other devices. The ECU 120 signals the fuel injectors 117 to open and spray the pressurized fuel into the engine 110. The duration that the fuel injectors 117 are open (pulse width) is proportional to the amount of fuel F delivered. For a sequential fuel injection system, the injector 117 opens relative to each individual cylinder.

In addition, the internal combustion engine 110 is also provided with various kinds of sensors 115 that detect the operating condition of the internal combustion engine in and generate detection signals (operating condition information), which are input to the ECU 120. For example, one or more sensors 115 measure the pressure across the fuel rail (rail pressure Prail). In addition, the sensors 115 include one or more position sensors that facilitate monitoring an angular position of the engine. In one or more examples, the sensors 115 output digital signals that are input to the ECU 120 for further analysis. Alternatively, or in addition, the sensors 115 may output analog signals that are converted to digital signals before inputting into the ECU 120 for further analysis.

In one or more examples, the ECU 120 monitors the outputs of the sensors 115, such as the $P_{rail}$ and angular position of the engine, to measure fuel injection to the ICE 110. The ECU 120 may also receive an injection timing signal T input from the internal combustion engine 110, and an engine speed signal Pe from a rotation sensor (not shown) mounted on the internal combustion engine 110. For example, the fuel injection measurement includes a quantity of fuel injected $Q_{inj}$, rate of fuel injection per unit time ($V_p$), or the like. In one or more examples, the ECU 120 outputs the fuel injection measurement signals. Alternatively, or in addition, the ECU 120 uses the fuel injection measurement for controlling the operation of the ICE 110. For example, the ECU 120 generates an injector drive signal D for the fuel injectors 117 and an ignition signal for spark plugs (not shown) in accordance with the operating condition of the ICE 110, and inputs them to the ICE 110.

For example, the ECU 120 ensures that an appropriate amount of fuel F corresponding to the engine operating condition is supplied from the fuel tank 130 to the ICE 110 at appropriate timing. The ECU 120 calculates the amount of fuel to be injected, fuel injection timing, etc., corresponding to the engine operating condition in accordance with prescribed computer executable programs stored beforehand, and inputs the injector drive signal DJ to the internal combustion engine 110 thereby to drive the injectors. At the same time, the ECU 120 executes a method for measurement of the fuel injection for measuring the flow rate of the fuel, as described herein.

Figure 2:
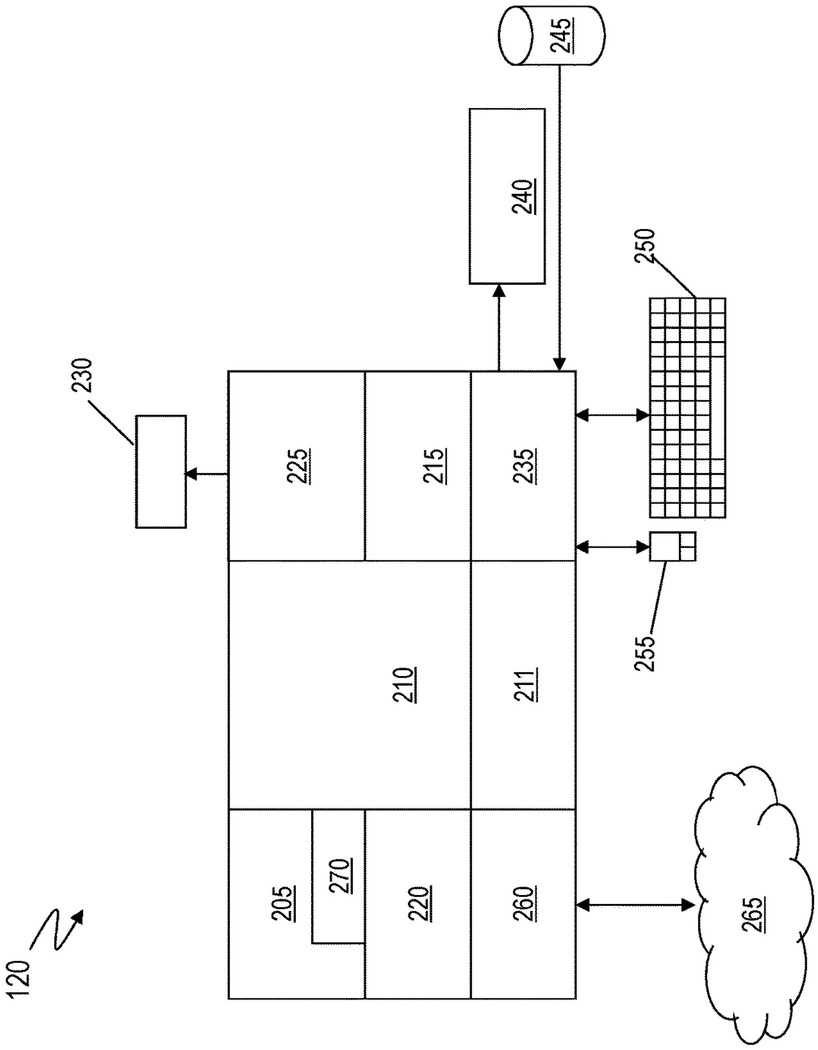
FIG. 2 illustrates an example block diagram of an example engine control unit.

FIG. 2 illustrates an example block diagram of the ECU 120. The ECU 120 includes hardware, such as electronic circuitry. For example, the ECU 120 includes, among other components, a processor 205, memory 210 coupled to a memory controller 215, and one or more input devices 245 and/or output devices 240, such as peripheral or control devices, that are communicatively coupled via a local I/O controller 235. These devices 240 and 245 may include, for example, battery sensors, position sensors (altimeter, accelerometer, GPS), indicator/identification lights and the like. Input devices such as a conventional keyboard 250 and mouse 255 may be coupled to the I/O controller 235. The I/O controller 235 may be, for example, one or more buses or other wired or wireless connections, as are known in the art. The I/O controller 235 may have additional elements, which are omitted for simplicity, such as controllers, buffers (caches), drivers, repeaters, and receivers, to enable communications.

The I/O devices 240, 245 may further include devices that communicate both inputs and outputs, for instance disk storage, a network interface card (NIC) or modulator/demodulator (for accessing other files, devices, systems, or a network), a radio frequency (RF) or other transceiver, a bridge, a router, and the like.

The processor 205 is a hardware device for executing hardware instructions or software, particularly those stored in memory 210. The processor 205 may be a custom made or commercially available processor, a central processing unit (CPU), an auxiliary processor among several processors associated with the ECU 120, a semiconductor based microprocessor (in the form of a microchip or chip set), a macroprocessor, or other device for executing instructions. The processor 205 includes a cache 270, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 270 may be organized as a hierarchy of more cache levels (L1, L2, and so on.).

The memory 210 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, or the like). Moreover, the memory 210 may incorporate electronic, magnetic, optical, or other types of storage media. Note that the memory 210 may have a distributed architecture, where various components are situated remote from one another but may be accessed by the processor 205.

The instructions in memory 210 may include one or more separate programs, each of which comprises an ordered listing of executable instructions for implementing logical functions. In the example of FIG. 2, the instructions in the memory 210 include a suitable operating system (OS) 211. The operating system 211 essentially may control the execution of other computer programs and provides scheduling, input-output control, file and data management, memory management, and communication control and related services.

Additional data, including, for example, instructions for the processor 205 or other retrievable information, may be stored in storage 220, which may be a storage device such as a hard disk drive or solid state drive. The stored instructions in memory 210 or in storage 220 may include those enabling the processor to execute one or more aspects of the systems and methods described herein.

The ECU 120 may further include a display controller 225 coupled to a user interface or display 230. In some embodiments, the display 230 may be an LCD screen. In other embodiments, the display 230 may include a plurality of LED status lights. In some embodiments, the ECU 120 may further include a network interface 260 for coupling to a network 265. The network 265 may be an IP-based network for communication between the ECU 120 and an external server, client and the like. In an embodiment, the network 265 may be a controller area network (CAN). The network 265 transmits and receives data between the ECU 120 and external systems. The network 265 may be a fixed wireless network, or a wireless network, and may include equipment for receiving and transmitting signals.

Figure 3:
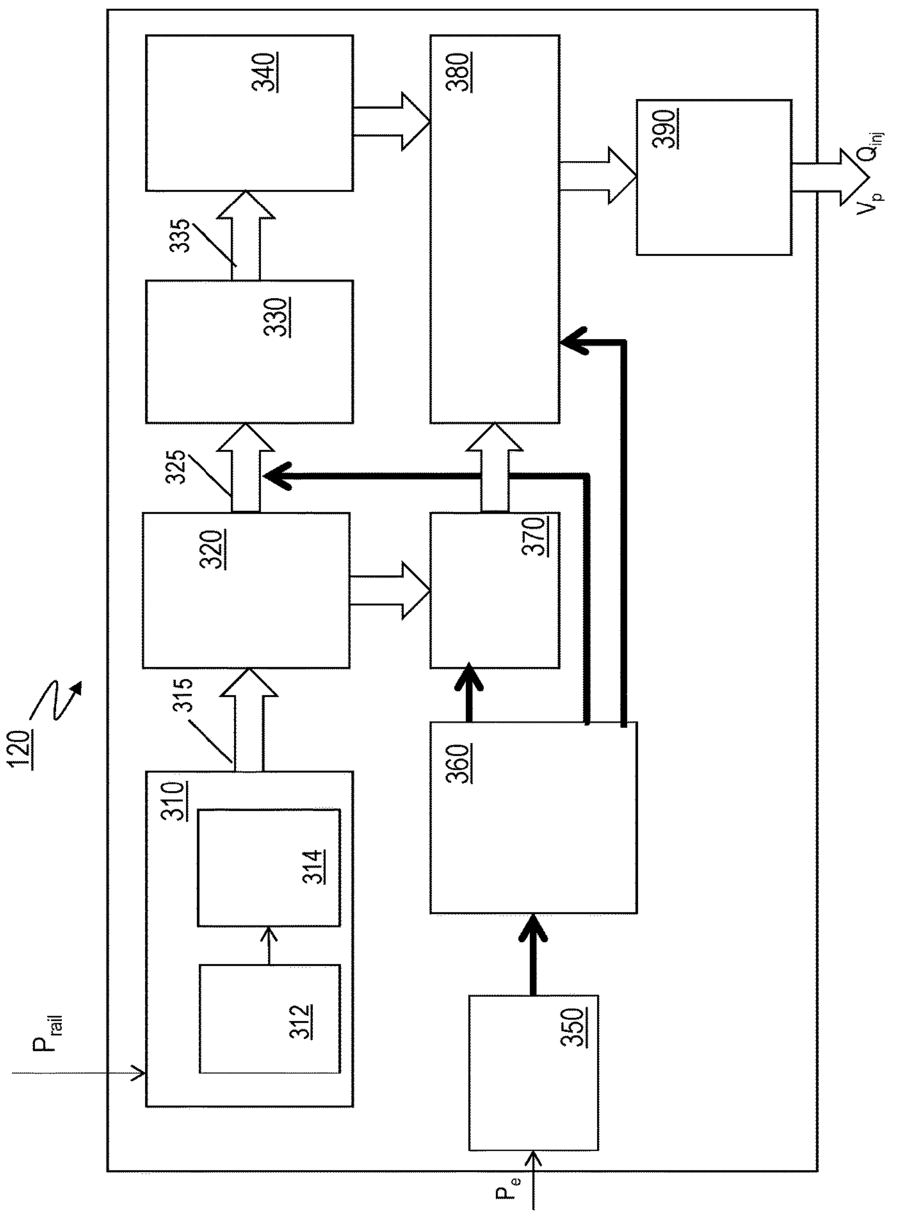
FIG. 3 illustrates a block diagram of an example engine control unit for performing fuel injection measurements.

FIG. 3 illustrates a block diagram of an example ECU 120 for implementing a fuel injection measurement according to one or more embodiments. The modules depicted in FIG. 3 are for illustration only, and in other implementations, the fuel injection may be measured using fewer, additional, or different modules than those depicted.

For example, the ECU 120 may include a data receiving module 310, an acquisition buffer 320, a hardware filtering module 330, a filtered data buffer 340, an engine synchronization module 350, a buffer synchronization module 360, an integral calculation module 370, a data selection module 380, and a fuel injection computation module 390. Each of the modules may be processing circuitry that includes an application specific integrated circuit (ASIC), an electronic circuit, a processor (shared, dedicated, or group) and memory that executes one or more software or firmware programs, a combinational logic circuit, and/or other suitable components that implement one or more methods and/or operations described herein. In one or more examples, the modules include one or more computer executable instructions that are executed to implement the methods and/or operations.

The data receiving module 310 receives pressure data from the ICE 110. In one or more examples, the data receiving module 310 includes an analog-to-digital converter (ADC) 312 and a decimation filter module 314. The ADC 312 ensures linearity of resolution in the pressure samples output $P_{rail}$ after digitizing the input analog pressure signal. The decimation filter 314 facilitates reducing the sampling rate of the pressure signal using a predetermined sampling ratio.

The ECU 120 further includes an acquisition buffer 320 to store a predetermined number of the digitized pressure samples. The acquisition buffer 320 has a predetermined dimension to store a pressure waveform at a predetermined minimum engine speed, that is dimension to store a maximum number of pressure samples. The ECU 120 may initialize the acquisition buffer 320 at a specific memory address at startup.

Further, the ECU 120 includes a dedicated direct memory access (DMA) channel, channel-A 315 that stores the digitized and decimated pressure signal samples into the acquisition buffer 320. In one or more examples, the ECU 120 initializes channel-A to the memory address of the acquisition buffer 320 at startup. Accordingly, the processor 205 of the ECU 120 can continue to perform other operations while the digitized pressure signal samples are being stored into the acquisition buffer 320. Further, in one or more examples, the acquisition buffer 320 is a circular buffer. Hence, the channel-A continues to overwrite existing values in the acquisition buffer 320 as an index for the circular acquisition buffer 320 reaches the maximum dimension and loops back.

Figure 4B:
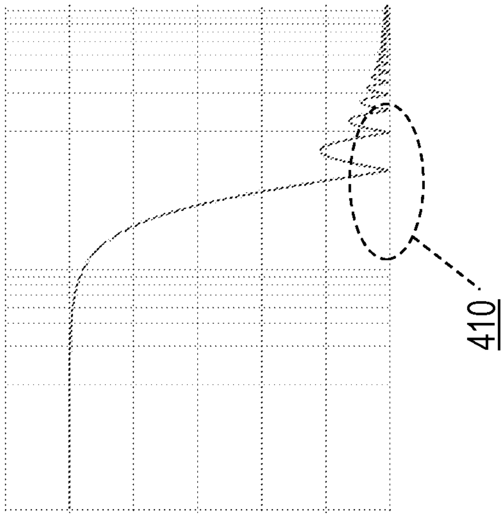
FIG. 4B illustrates example n-order sinc filter.
Figure 4A:
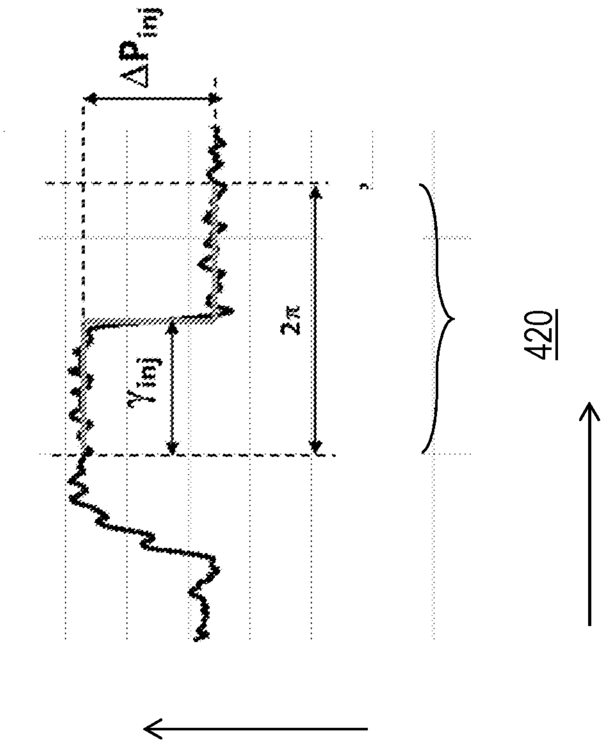
FIG. 4A illustrates example rail pressure values for an example fuel injection cycle.

Further, the ECU 120 includes the filter module 330 that facilitates removing noise from the digitized pressure samples in the acquisition buffer 320. For example, the decimation filter 314 uses a sinc filter to determine pressure signal Peq by filtering the $P_{rail}$ pressure signal. For example, FIG. 4A illustrates an example where the input $P_{rail}$ signal, which is composed of the $P_{eq}$ and the $P_{noise}$ signals is filtered to eliminate the $P_{noise}$ component so as to determine the $P_{eq}$ signal. The filter module 330 is a separate hardware component that filters the data that is input to the filter module 330, without intervention from the processor 205. For example, the filter module 330 may include a second processor, separate from the processor 205. The filter module 330 can implement a N-ordered sinc filter to eliminate the wave pressure components from the pressure signal $P_{rail}$. FIG. 4B illustrates an example sinc filter 410 that is tuned on rail wave-pressure dominant frequency to eliminate the wave component from the input signal $P_{rail}$ providing the filtered output signal $P_e$. Further, the filter 410 uses a predetermined oversampling ratio (OSR) to preserve the pressure signal spectrum width of the signal $P_e$. The sinc filter illustrated is an example N-ordered sinc filter; in other implementations different sinc filters may be used.

In one or more examples, the ECU 120 includes a second DMA channel-B 325 that is dedicated to copy contents from the acquisition buffer to a predetermined input address for the filter module 330. For example, the ECU 120, at startup initializes the input address for the filter module 330. Accordingly, the processor 205 can continue to perform other operations while the data from the acquisition buffer is copied to the dedicated input of the filter module 330 and filtered by the filter module 330.

Further, the ECU 120 includes a filtered data buffer 340, which is a dedicated output buffer for the filter module 330. The filtered data buffer 340 has a predetermined dimension to store the pressure waveform at the predetermined minimum engine speed, that is dimension to store the maximum number of pressure samples. The ECU 120 may initialize the filtered data buffer 340 at a specific memory address at startup. Further, the ECU 120 includes a third DMA channel-C 335 that is setup to copy data output by the filter module 330 to the filtered data buffer 340. Further, in one or more examples, the filter data buffer 340 is a circular buffer. Hence, the channel-C 335 continues to overwrite existing values in the filtered data buffer 340 as an index for the circular filtered data buffer 340 reaches the maximum dimension and loops back.

The ECU 120 further includes an engine synchronization module 350 that synchronizes the pressure data in the one or more buffers of the ECU 120 according to the operation of the ICE 110. For example, the engine synchronization module 350 monitors the sensors 115 to determine angular position of the engine. In one or more examples, the engine synchronization module 350 receives, or generates an interrupt, such as an angle-task interrupt in response to the angular position of the engine corresponding to $\gamma_{inj}$, when the fuel is injected into the ICE 110.

FIG. 4A illustrates an example fuel injection cycle 420, in which one of the fuel injectors 117 operates in an angular slot having a width of 2$n$. During the fuel injection cycle 420, one of the fuel injectors 117 injects fuel F into the ICE 110 during the time the fuel injector is in angular position $\gamma_{inj}$. In other words, in FIG. 4A $\gamma_{inj}$ represents a specific angular position of one of the fuel injectors 117 at which the fuel is injected into the ICE 110. When the injection occurs the pressure is dropped by $\Delta P_{inj}$. The pressure drop $\Delta P_{inj}$ depends on the amount of fuel injected into the ICE 110. Accordingly, in absence of fuel-static leakages, such as due to pressure reliever or the injectors 117, the fuel injection delivery is computed as $Q_{inj}=f(\Delta P_{inj})$. The relationship f between the fuel injection and pressure drop may be a predetermined relationship. For example, the relationship may be a $2^{nd}$ order polynomial in which coefficients are dependent upon the rail pressure level. In one or more examples, the coefficients can be provided by a Look-Up-Table addressed by the rail pressure level.

Table 1 illustrates an example computation for the rail pressure drop $\Delta P_{inj}$ and injection position $\gamma_{inj}$. In the illustrated calculations, θ represents an angular position of the engine. $L_\alpha$ and $L_\beta$ represent two integral operators applied to the rail pressure signal capable to reject to average pressure level.

Table 1

Rail pressure drop $\Delta P_{inj}$ & injection position $\gamma_{inj}$ $$L_\alpha \cong \int_0^{2\pi} P_{eq}\cdot\cos(\theta)d\theta = \Delta P_{inj}\cdot\sin\gamma_{inj}$$

$$L_\beta \cong \int_0^{2\pi} P_{eq}\cdot\sin(\theta)d\theta = \Delta P_{inj}\cdot(1-\cos\gamma_{inj})$$

$$\Delta P_{inj} = -\frac{L_\alpha^2+L_\beta^2}{2L_\beta} \quad \gamma_{inj} = \arcsin\left(-\frac{2L_\alpha L_\beta}{L_\alpha^2+L_\beta^2}\right)$$

Figure 5:
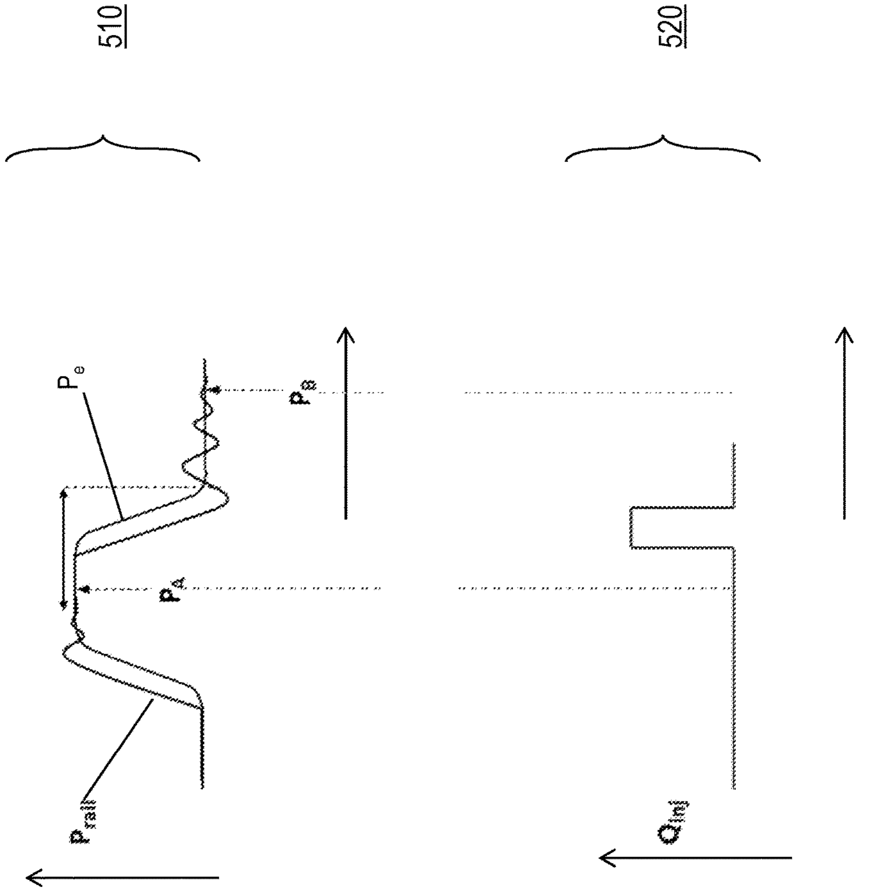
FIG. 5 illustrates an example graph of pressure signals, and an example graph of corresponding fuel injection measurements.

Accordingly, the technical solutions described herein facilitate computing the pressure drop $\Delta P_{inj}$ and fuel injection position $\gamma_{inj}$ for each fuel injection cycle for the ICE 110 by identifying the samples of the pressure signal $P_e$ for computing the pressure drop $\Delta P_{inj}$. For example, FIG. 5 illustrates an example graph 510 of the pressure signals, and an example graph 520 of corresponding fuel injection. In the graph 510, the input pressure signal $P_{rail}$ is filtered to provide the pressure signal $P_e$. The values $P_A$ and $P_B$ are identified from the pressure signal $P_e$ to determine the pressure drop $\Delta P_{inj}$. Further, the pressure drop $\Delta P_{inj}$ is used to compute the quantity of fuel injected into the ICE 110. Correspondingly, in graph 520, the fuel injectors 117 inject an amount of fuel $Q_{inj}$ that is associated with the pressure drop $\Delta P_{inj}$ according to the predetermined relationship. Thus, by identifying $P_A$ and $P_B$, the amount of fuel $Q_{inj}$ injected can be computed.

As described earlier, computing the fuel injection quantity in this manner may include processing large amounts of pressure samples, which may increase the computational load on the ECU 120 and in turn adversely affect other operations of the ECU 120, such as controlling the ICE 110. Accordingly, the technical solutions described herein facilitate identifying and selecting a subset of the input pressure samples from the input data and computing the fuel injection quantity $Q_{inj}$ based on the selected pressure samples, thus reducing the time and resources used for the computation. Accordingly, the technical solutions address the technical challenges of computing the fuel injection quantity using the ECU 120 without adversely affecting the other operations of the ECU 120.

In one or more examples, the buffer synchronization module 360 of the ECU 120 facilitates selecting a subset of the pressure values in the acquisition buffer 320 to reduce the computations required for computing the fuel injection measurement. Further, the ECU 120 includes the integral calculation module 370 that computes the values of $L_\alpha$ and $L_\beta$ by integrating the pressure values from the acquisition buffer 320. In one or more examples, the integral computation module continuously computes the integrals using the processor 205, as a low priority task. The buffer synchronization module 360 facilitates identifying the integral results from the already computed results.

For example, the data selection module 380 identifies the subset of the integration results to be used for further computation by the fuel injection computation module 390. For example, the fuel injection computation module 390 uses only the selected subset of data according to the data selection module 380 to compute the pressure drop and the angular position. Further, the fuel injection computation module 390, based on the pressure drop, computes the fuel injection quantity using the predetermined relationship. Accordingly, the amount of data processed by the processor 205 for computing the fuel injection quantity is reduced by using the DMA channels 315, 325, and 335, by using hardware filter module 330, and further by selecting subsets of the data that only correspond to the angular position of the engine when the fuel is injected into the ICE 110. Thus, the technical solutions reduce the time and resources used for the computation, and in turn improve the performance of the ECU 120. Further, because of the use of the DMA channels 315, 325, and 335, and the hardware filter module 330, the ECU 120 can continue to perform other operations such as for controlling the ICE 110, while the data to be used for computing the fuel injection quantity is identified in the background.

Figure 6:
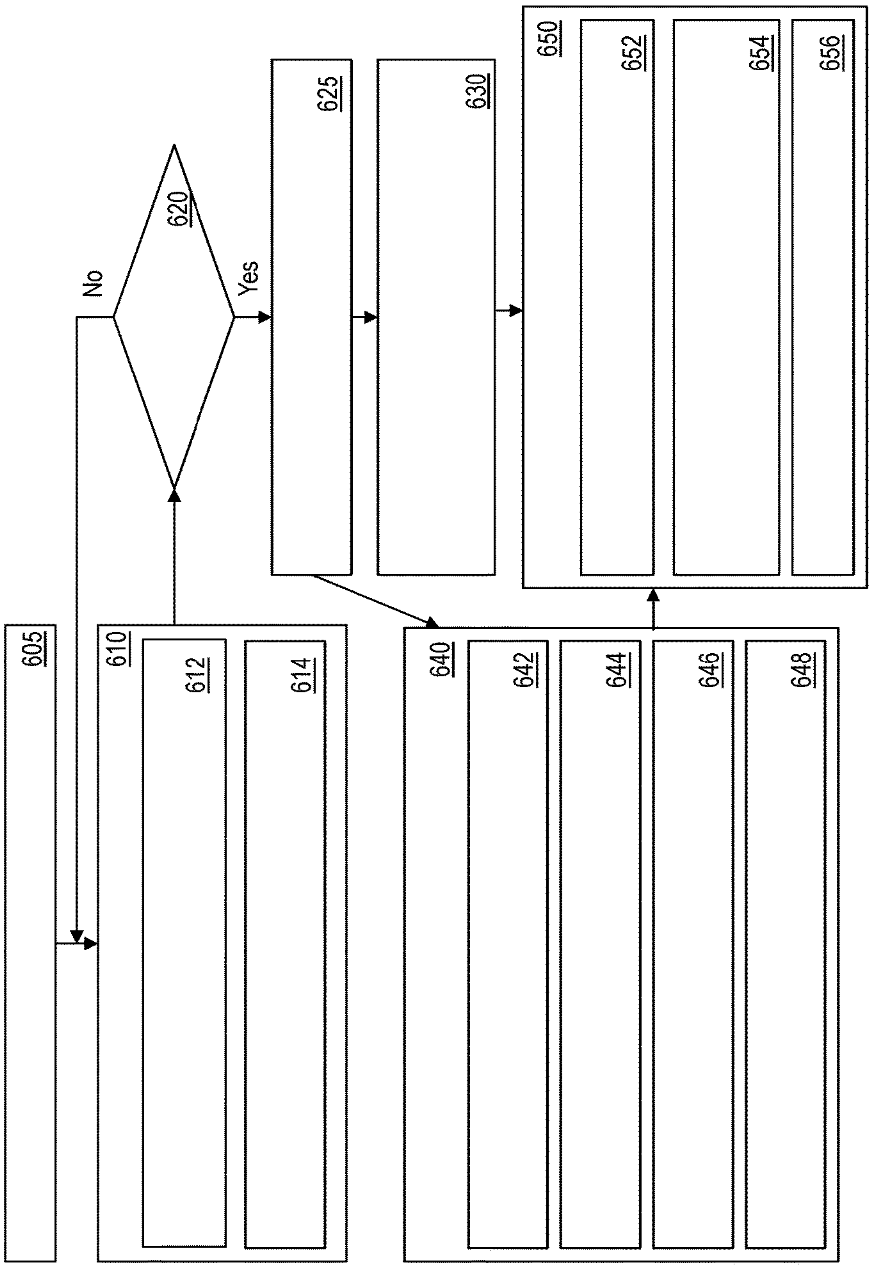
FIG. 6 illustrates a flowchart of an example method for fuel injection measurement.

FIG. 6 illustrates a flowchart of an example method for computing the fuel injection quantity for the ICE 110 according to one or more embodiments. The ECU 120 implements the method. The ECU 120 initializes the DMA channel-A 315, as shown at 605. For example, the ECU 120 sets up the channel-A 315 with the memory address of the output of the data receiving module 310, and the memory address of the acquisition buffer 320. The ECU 120 continuously receives rail pressure values from the sensors 115. The ECU 120 upon receipt of a rail pressure signal value filters and stores a digitized sample, as shown at 610. For example, the data receiving module 310 receives the rail pressure signal. The ADC 312, in response, digitizes the input pressure signal to generate digitized pressure sample, which is subsequently decimated by the decimation filter 314, as shown at 612. The digitized and decimated pressure sample value is then stored into the acquisition buffer 320 using the initialized DMA channel-A 315, as shown at 614. The processor 205 of the ECU can continue to perform other operations during this time, while the rail pressure signal is received, digitized, decimated, and stored into the acquisition buffer 320.

The processor 205, using a low priority task (in relation to tasks for ICE control), computes $L_\alpha$ and $L_\beta$ as depicted in Table 1 by integrating the pressure values in the acquisition buffer 320. Because the integration is performed using a low priority task, the processor 205 prioritizes the ICE control tasks over the computation of $L_\alpha$ and $L_\beta$. Further, the integration computations are performed in parallel to the filtering of storing and filtering of the pressure values in the acquisition buffer 320, further improving the performance of the ECU 120 for computing the fuel injection measurement.

As described earlier, the engine synchronization module 350 monitors the angular position of the engine, and generates an angle-based event in response to the angular position of the engine corresponding to delivery of the fuel into the ICE 110. In one or more examples, the angle-based event is manifested as an interrupt to the processor 205, to trigger computation for the fuel injection measurement. Until the angle-based interrupt is received by the processor 205, the processor 205 continues the ICE control tasks. In response to the angle-based event, the processor 205 captures a working memory address of the DMA channel-A 315, as shown at 620 and 625. The working address is the last location in the acquisition buffer 320 at which the DMA channel-A 315 stored a pressure sample value. In addition, the processor 205 captures and stores a working memory address of the DMA channel-C 335 and maps the two captured working addresses. Accordingly, the processor 205 can identify the unfiltered pressure values from the acquisition buffer 320 and the corresponding filtered pressure values from the filtered data buffer 340, based on the captured working addresses.

In one or more examples, the ECU 120 includes an additional DMA channel-D (not shown) that is triggered to capture the working address of the DMA channel-A 315 and/or the DMA channel-C 335. The additional DMA channel-D is triggered synchronously with the angle-based event, and thus, minimizes angular error due to higher priority interrupts. For example, in response to the angle-based event, the DMA channel-D captures the working address of the DMA channel-A 315 and/or the DMA channel-C 335. In one or more examples, the captured working address(es) is stored in a register of the processor 205. Alternatively, or in addition, the ECU 120 includes a DMA controller, which is separate from the processor 205, and that has one or more registers that are used to capture the working addresses.

The processor 205 stores the captured working address for performing the fuel injection measurement computations, as a lower priority task in comparison to a task related to controlling the ICE 110. Accordingly, in case the processor 205 is interrupted for a higher priority task related to the controlling the ICE 110, the processor 205 completes the higher priority task first, and returns to the fuel injection measurement computation based on the captured working address of the channel-A 315.

Further, in response to the angle-based interrupt, the processor 205 reconfigures the components to filter the subsequent pressure samples to eliminate pressure waves, as shown at 640. For example, the processor 205 resets the DMA channel-B 325 using the captured working address of the DMA channel-A 315 to copy the digitized and decimated pressure data values that are being stored into the acquisition buffer 320 into the input buffer of the hardware filter module 330, as shown at 642. The DMA channel-B 325 thus facilitates filtering the incoming pressure values using the filter module 330, which uses a filter such as a n-order sinc filter, as shown at 644.

Further, in response to the angle-based interrupt, the processor 205 resets the DMA channel-C 335 to the output address of the pressure-wave hardware filter module 340 and the filtered data buffer 340, as shown at 646. Accordingly, the output of the filter module 330 is directly replicated into the filtered data buffer 340, without processor intervention, as shown at 648.

In parallel, or concurrently to the above described filtering, in which the pressure values from the acquisition buffer 320 are filtered by the filter module 330 and the results stored into the filtered data buffer 340, the processor 205 computes the Lα and Lβ values from the un-filtered pressure values in the acquisition buffer 320, as shown at 625 and 630. The processor 205 computes the integral values using the pressure values in the acquisition buffer 320 starting from the captured working address.

Further, in response to the angle-based interrupt, the processor 205 computes the fuel injection quantity using the subset of the pressure data, as shown at 650. The processor 205 computes the pressure drop using the contents of the filtered data buffer 340, as shown at 652. For example, the processor 205 determines the highest and the lowest pressure values in the filtered pressure values in the filtered data buffer 340, and computes the difference between them as the pressure drop. The data subset corresponds to the angular slot containing the injection cycle. The processor 205 identifies the data subset length, that is a number of samples to process, on the basis of sampling data ratio and the engine speed. Once the data subset width is known, using the last memory address of the DMA channel C the processor 205 further identifies the ending-boundary memory addresses containing the data subset for processing.

Further, the processor 205 computes the injection angle position using the integral computation results, as shown at 654. For example, the injection angle position can be computed according to Table 1. Further yet, the processor computes the fuel injection quantity $Q_{inj}$ based on the pressure drop using the predetermined relationship between the pressure drop and the quantity, as shown at 656.

As described above, the DMA channel-A 315 is continuously operating once the channel-A 315 is initialized at startup. The DMA channel-A continuously stores the rail pressure values that are digitized and decimated by the data receive module 310 into the acquisition buffer 320. The DMA channel-B 325 is configured in response to the angle-based interrupt. Accordingly, the DMA channel-B 325 only accesses a first subset of the pressure values from the acquisition buffer that is based on the captured working address of the channel-A in response to the angle-based interrupt. The DMA channel-C 335 accesses a second subset of the pressure values, the second subset including pressure values that are filtered by the hardware filter module 330. Thus, each subsequent DMA channel uses lesser data.

Accordingly, the technical solutions described herein facilitate performing the fuel injection measurements by an ECU. In one or more examples, the fuel injection measurement provides a quantity of fuel injected into an engine during a previous injection cycle. The measurement of the quantity of fuel facilitates controlling speed and load of the engine. Further, measurement of the fuel injected into the engine is used to measure fuel efficiency and other metrics of the engine. Further yet, computing the quantity of the fuel injection can facilitate detection of fuel loss based on the actual quantity of fuel in the fuel tank. Moreover, by measuring the fuel injection, the ECU facilitates compensation of injector drift due to manufacturing tolerance and aging. Having accurate injection further facilitates limiting emissions and maintaining the engine turbo safe.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, or the like having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the technical solutions described herein not be limited to the particular embodiments disclosed, but will include all embodiments falling within the scope of the application.

What is claimed is:

1. An engine control unit that controls an engine, the engine control unit comprising:
- a first direct memory address channel configured to store rail pressure values received from an engine in a first buffer;
- a second direct memory address channel configured to copy a first subset of the rail pressure value from the first buffer to a filter module in response to an angle-based interrupt request;
- a third direct memory address channel configured to copy filtered pressure values from the filter module to a second buffer; and
- a processor configured to:
  - compute a pressure drop based on the filtered pressure values from the second buffer; and
  - compute a quantity of fuel injected into the engine based on the pressure drop.

2. The engine control unit of claim 1, wherein the processor initializes the first direct memory address channel at startup with a predetermined address of the first buffer.

3. The engine control unit of claim 1, wherein, in response to the angle-based interrupt request, the processor initializes the second direct memory address channel with a working address of the first direct memory address channel at the time the angle-based interrupt request is received.

4. The engine control unit of claim 3, wherein the first subset of the rail pressure values comprises rail pressure values from the working address.

5. The engine control unit of claim 1, wherein, the third direct memory address channel copies output from the filter module to the second buffer in response to the angle-based interrupt request being received.

6. The engine control unit of claim 1, wherein the filter module is an nth-order sinc filter.

7. The engine control unit of claim 1, wherein the angle-based interrupt request is indicative of the engine being at a predetermined angular position.

8. A computer program product for computing quantity of fuel injected into an engine, the computer program product comprising non-transitory computer readable storage medium that comprises computer executable instructions to:

store rail pressure values received from the engine to a first buffer using a first direct memory address channel;

copy a first subset of the rail pressure values from the first buffer to a filter module using a second direct memory address channel, in response to an angle-based interrupt request;

copy filtered pressure values from the filter module to a second buffer using a third direct memory address channel;

compute a pressure drop based on the filtered pressure values from the second buffer; and compute a quantity of fuel injected into the engine based on the pressure drop.

9. The computer program product of claim 8, wherein the first direct memory address channel is initialized at startup with a predetermined address of the first buffer.

10. The computer program product of claim 8, wherein, in response to the angle-based interrupt request, the second direct memory address channel is initialized with a working address of the first direct memory address channel at the time the angle-based interrupt request is received.

11. The computer program product of claim 10, wherein the first subset of the rail pressure values comprises rail pressure values starting at the working address.

12. The computer program product of claim 8, wherein, the third direct memory address channel copies output from the filter module to the second buffer in response to the angle-based interrupt request being received.

13. The computer program product of claim 8, wherein the filter module is an nth-order sinc filter.

14. The computer program product of claim 8, wherein the angle-based interrupt request is indicative of the engine being at a predetermined angular position.

15. A computer-implemented method for measuring fuel injected into an engine, the computer-implemented method comprising:

continuously storing rail pressure values from the engine into a first buffer using a first direct memory access channel; and in response to an event indicating that the engine is at a predetermined angular position:

capturing a working memory address of the first direct memory access channel, wherein the working memory address is an address from the first buffer at which a last rail pressure value is last stored;

filtering subsequent rail pressure values, starting at the working memory address, from the first buffer into a second buffer using a second direct memory access channel;

computing a pressure drop from the rail pressure values that are stored in the second buffer; and computing a quantity of fuel injected into the engine based on the pressure drop.

16. The computer-implemented method of claim 15, wherein filtering the rail pressure values from the first buffer comprises:

copying, by the second direct memory access channel, the subsequent rail pressure values, starting at the working memory address, from the first buffer into an input area of a hardware filter module; and copying, by a third direct memory access channel, output of the hardware filter module into the second buffer.

17. The computer-implemented method of claim 16, wherein the hardware filter module filters the rail pressure values to eliminate pressure-waves using a sinc filter.

18. The computer-implemented method of claim 15, further comprising:

computing a fuel injection position of the fuel injector based on the subsequent rail pressure values in the first buffer, starting from the captured working address.

* * * * *